Sept. 1, 1959 E. KNECHT 2,902,285

RECORD CHANGER

Filed Nov. 19, 1953 2 Sheets-Sheet 1

Inventor:
EMIL KNECHT
By [signature]
HIS ATTORNEY.

Sept. 1, 1959 E. KNECHT 2,902,285

RECORD CHANGER

Filed Nov. 19, 1953 2 Sheets-Sheet 2

Inventor:
EMIL KNECHT
By [signature]
His Attorney

United States Patent Office 2,902,285

Patented Sept. 1, 1959

2,902,285

RECORD CHANGER

Emil Knecht, St. Georgen, Schwarzwald, Germany

Application November 19, 1953, Serial No. 393,135

1 Claim. (Cl. 274—10)

This invention relates to record changers, which permit automatic changing of records to be played, particularly to record changers in which the turntable is selectively rotatable at different speeds. The ability to change the speed is necessary when the record changer is to be usable for playing different types of record, for example for playing records which must run at 33⅓, 45 or 78 revolutions per minute.

In record changers it has hitherto been customary to drive the turntable and the record changing mechanism by means of the driving motor through the same gear. In record changers in which the turntable can be switched over to different speeds, however, the retention of this custom, owing to the necessity of providing a change-speed gear, results in that for a slow speed record the time required for effecting a change of record is very long, while in the case of a higher speed record the record change is effected in a substantially shorter time. The same time differences also occur in respect of the intervals between playing, that is to say, the previously adjusted interval is relatively short for a fast running record and relatively long for a slow running record. Both circumstances, i.e. both the different times required for changing records and the different lengths of intervals, are necessarily found to be disagreeable and disturbing in practice.

The present invention broadly aims at obviating the foregoing drawbacks and for this purpose contemplates making the drive of the record change mechanism by the motor, independent of the drive of the turntable.

This can be achieved very simply by deriving the drive of the record changing mechanism from the motor independently of the drive of the turntable.

Since the motor speed is always the same, the record change and the tone-arm movements will necessarily always proceed at constant speed, and also any retardation existing, the changing mechanism will always remain constant.

The device controlling the record change and the tone-arm movement can however also be rendered independent of the change-speed gear of the turntable by making said device connectable to the turntable through a disconnectable clutch and a second change-speed gear which cancels the various alterations in transmission ratio of the first change-speed gear. Although this arrangement requires a larger mechanism than the arrangement first mentioned, in which the drive of the turntable is derived directly from the motor, nevertheless this arrangement may be advantageous for adding to an existing installation, and also in those cases where it is not feasible for the parts which transmit the drive of the turntable and of the changing mechanism to be accommodated in a restricted space.

In order to enable the invention to be more readily understood, reference is made to the accompanying drawings which illustrate diagrammatically and by way of example, two embodiments thereof, and in which.

Figure 1:
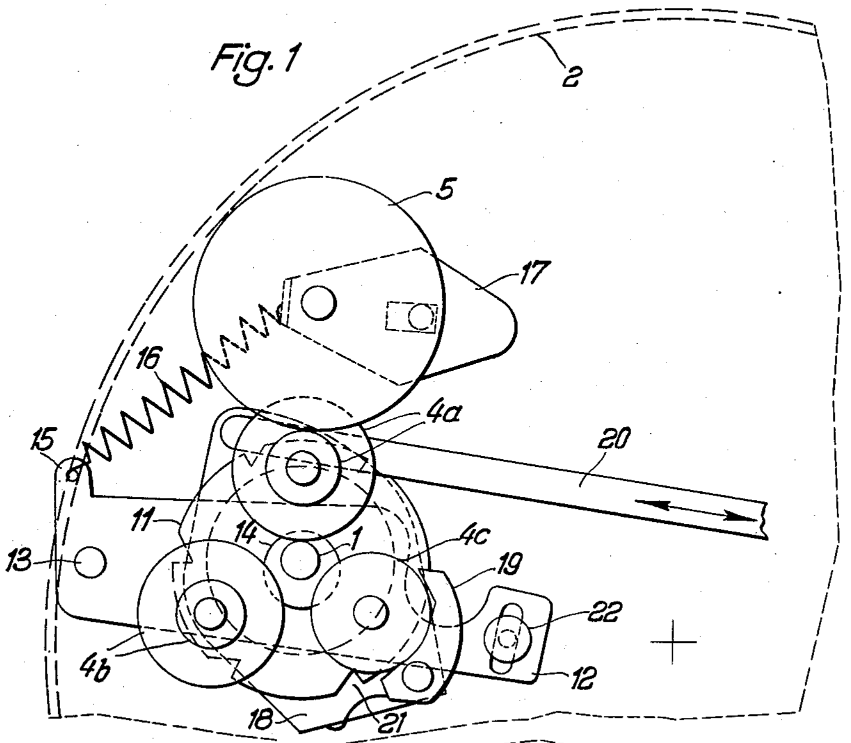
Figure 1 shows a plan view of the change-speed gear for the turntable of a record changer.
Figure 2:
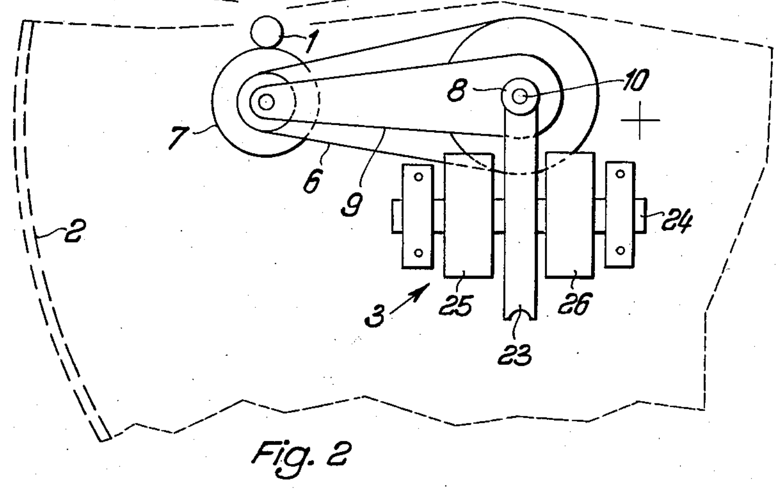
Figure 2 shows a plan view of the driving arrangement for the mechanism controlling the record change and the tone-arm movement.

According to Figures 1 and 2, the gear contains a friction wheel 1, which is mounted on the shaft of the driving motor, and from which the drive of the turntable 2 and a control mechanism 3 is derived. The turntable 2 is driven through three intermediary wheels 4*a*, 4*b*, 4*c* which are selectively engageable with the friction wheel 1 and a driving wheel 5. The friction wheel 1 is connected to the control mechanism 3 through a belt drive 6, which together with its driving wheel 7 and its transmission worm 8 is accommodated in a rocker 9, which can be rocked about the axis 10.

The intermediary wheels 4*a*, 4*b* and 4*c* are disposed planet-wise around the motor shaft or the friction wheel 1 and are rotatably secured on a rotatable disc 11.

Through the turning of the disc 11, the intermediary wheels come into engagement in succession, so that, in accordance with their dimensions or graduation, they enable different transmission ratios to be adjusted. The intermediary wheel 4*a* is of such dimensions that when it is engaged the turntable 2 runs at 45 revolutions per minute; the intermediary wheel 4*b* corresponds to 33⅓ revolutions per minute, and the intermediary wheel 4*c* to 78 revolutions per minute. The rotatable disc 11 is supported on a rocker 12, which is rockably mounted at 13 and embraces the friction wheel 1 with its recess 14. The lever arm 15 of the rocker 12 is connected by means of a tension spring 16 to a slide plate 17, on which the driving wheel 5 is mounted.

A step control mechanism is provided for controlling the intermediary wheels 4*a*, 4*b* and 4*c*. This consists of a rockable control plate 18 with pawl 19, a change-over lever 20 adapted to slide to-and-fro in the direction of the arrows shown, and a notched crown composed of notches 21 in the rotating disc 11. A total of six notches 21 are provided, so that two steps are required for each change-over.

In the various positions of the mechanism, the tension spring 16 ensures that the intermediary wheel 4 engaged is pressed against the friction wheel 1 on the motor shaft, and that on the other hand the driving wheel 5 bears under spring pressure against the intermediary wheel 4 engaged and against the edge of the turntable 2.

In order to effect a change-over it is merely necessary for the control plate 18 to be rocked with the aid of the change-over lever 20. On the first rocking stroke the rotating disc 11 is turned with the aid of the pawl 19 about one-sixth of its periphery. On this rotary movement the intermediary wheel 4*a* comes out of the position of engagement illustrated, so that the driving wheel 5 under the action of the spring 16 can be moved away from the turntable 2, while on the other hand the control rocker 12 can perform a rocking movement in the clockwise direction until it strikes against the pin 22. On the second control stroke the wheel 4*c* comes into engagement with the friction wheel 1 and the driving wheel 5, while the latter again comes to bear against the turntable 2.

The control mechanism 3 contains a worm wheel 23, which meshes with the worm 8. On the shaft 24 of the worm wheel 23 are mounted sets of cams 25 and 26, which control in manner known per se the record dropping device and the movement of the tone-arm. The rocker 9 enables the coupling between the friction wheel 1 and the control mechanism 3 to be established or disconnected. The arrangement is such that after a record has been played, and preferably also each time after the driving motor has been switched on, the coupling is established; the coupling is disconnected as soon as the tone-arm has been lowered on to the record ready for playing; uncoupling preferably also takes place after the last record has been played and the tone-arm has reached its outer position, preferably simultaneously with the switching off of the motor by the dropping device which then runs without load. The cam sets 25 and 26 are so arranged that the control mechanism can be adjusted to the record diameter desired. This adjustment can be conveniently made with the aid of push buttons or adjusting levers.

From the foregoing explanation it can be seen that the control mechanism 3 is always driven by the motor at the same speed. The record change and the tone-arm movements consequently always take place at constant speed, irrespective of the various speeds of the turntable.

Figure 3:
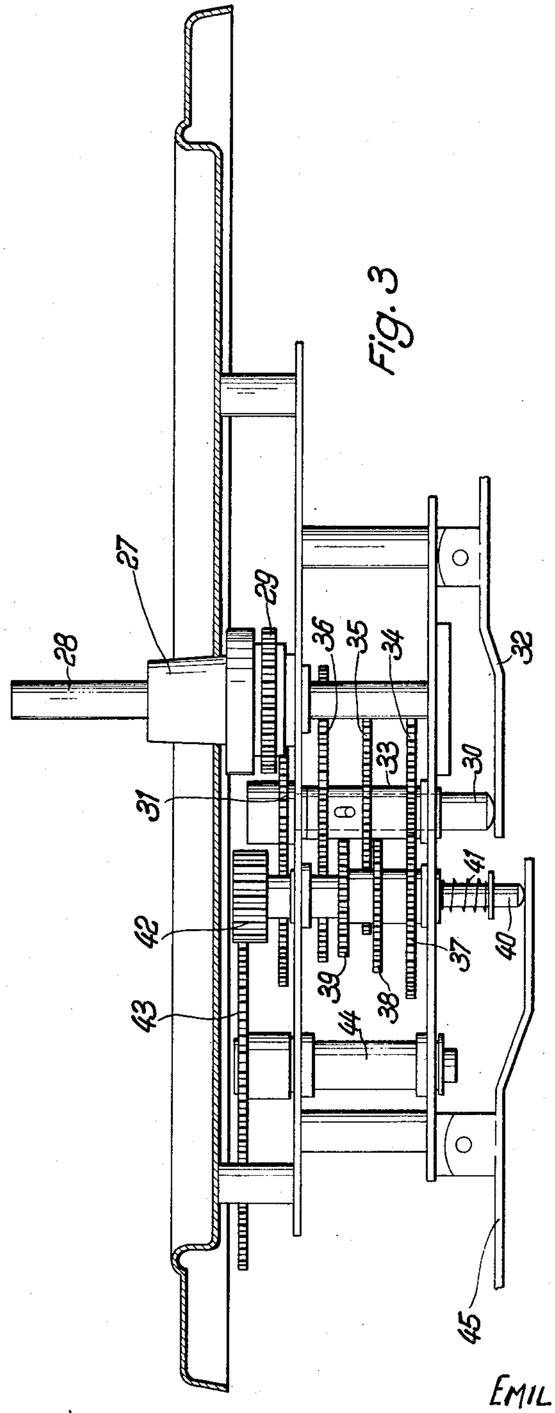
Figure 3 shows a change-speed gear which can be coupled to the turntable for the transmission of the drive from the latter to the device controlling the record change and the tone-arm movement.

The arrangement illustrated in Figure 3 can be used instead of the arrangement illustrated in Figure 2, when the drive of the device controlling the record change and the tone-arm movement is to be derived from the turntable. As can be seen in Figure 3 the turntable spindle 28 carrying the turntable by means of the bearing 27 is provided with a toothed crown 29 with which a gear-wheel 31 mounted on the axially slidable shaft 30 can be brought into engagement. The axial displacement of the shaft 30 is brought about by a lever 32 which in turn is operated by the control device for the record change and the tone-arm movement. The arrangement is such after a record has been played, and preferably also whenever the driving motor is switched on, the operative connection between the shaft 30 and the turntable spindle 28 is established; uncoupling is effected as soon as the tone-arm has been lowered onto the record which is ready to be played, and preferably also after the last record has been played and the tone-arm has reached its outer position.

On the sleeve 33 about the shaft 30 and non-rotatably connected to the shaft 30 are secured three additional gear-wheels 34, 35 and 36 cooperating with the gear-wheels 37, 38 and 39 on an intermediate shaft 40. The wheels 37, 38 and 39 are disposed at a distance from one another such that they can only come alternately into engagement with the gear-wheels 34, 35 and 36, and for this purpose require an axial displacement of different magnitude of the shaft 40. The shaft 40 is urged by the spring 41 into its lowest position. It can however be displaced against the action of the spring 41, in which case the broad gear-wheel 42 at the top end of the shaft 40 remains in engagement with a gear-wheel 43 which is fastened on the control shaft 44 for the tone-arm movement and the record change. The control shaft 44 may be provided with a time mechanism which permits the interval between two playings to be timed as desired.

The axial displacement of the shaft 44 is effected by means of a lever 45 which is coupled in a predetermined manner to the adjusting mechanism of the change-speed gear shown in Figure 1. The arrangement is such that an increase of the speed of the turntable, adjusted with the gear shown in Figure 1, is cancelled with the aid of the gear shown in Figure 3, so that despite the alteration of the turntable speed, the speed of the shaft 44 carrying the control mechanism for the record change and the tone-arm movement remains unchanged.

What I claim is:

A variable speed phonograph with constant speed record changer comprising a constant speed drive shaft, a turntable, a turntable driving wheel, an annular disc, a rocker arm rotatably supporting the annular disc, a plurality of friction wheels each having two steps of which the step of the larger diameter is adapted to engage the drive shaft and that of the smaller diameter the turntable driving wheel, the diameters of the step wheels differing from each other in accordance with the predetermined turntable speeds, means operable to move to and maintain at the selected speed position the annular disc to engage the corresponding friction wheel steps to the shaft and the turntable wheel, a spindle supporting the turntable, a first gear integrally on the spindle, an axially slidable shaft parallel to the spindle, a second gear integrally on the axially slidable shaft, a first lever adapted on actuation at predetermined intervals to displace the axially slidable shaft to engage the second gear to the first gear, a sleeve keyed to and about the axially slidable shaft, a first plurality of axially spaced gears of different diameters on the sleeve, an axially displaceable intermediate shaft parallel to the spindle, a third gear integrally on the intermediate shaft, a second plurality of axially spaced gears of different diameters about the intermediate shaft, a second lever engaging one end of the intermediate shaft, a spring coiled about the intermediate shaft and urging it against the second lever, and a mechanism drive gear at all times meshing with the third gear, the actuation of the second lever after actuation of the first lever moving the intermediate shaft axially against the tension of the coiled spring to engage one of the gears of the second plurality of axially spaced gears with a corresponding one of the gears of the first plurality of axially spaced gears to rotate the third and fourth gears at a constant speed irrespective of which corresponding gears of the first and second pluralities of axially spaced gears are engaged.

References Cited in the file of this patent

UNITED STATES PATENTS

| | | |
|---|---|---|
| 1,929,092 | Diehl et al. | Oct. 3, 1933 |
| 2,064,777 | Winchell | Dec. 15, 1936 |
| 2,270,179 | Wright | Jan. 13, 1942 |
| 2,652,258 | Dale et al. | Sept. 15, 1953 |
| 2,673,089 | Osborne | Mar. 23, 1954 |